ered" in order that the angular
UNITED STATES PATENT OFFICE.

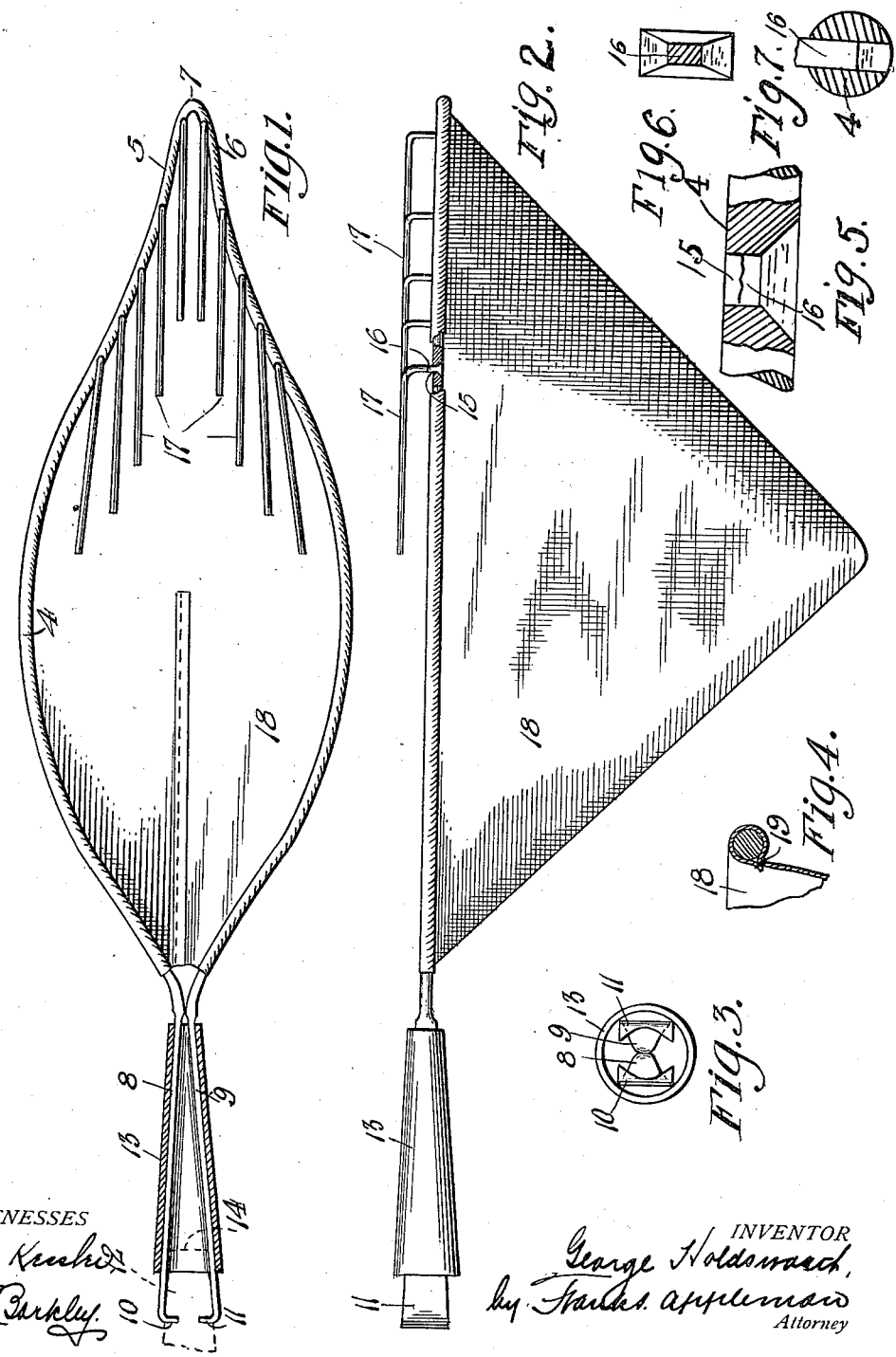

GEORGE HOLDSWORTH, OF CONESVILLE, OHIO.

FRUIT-GATHERER.

1,009,246.   Specification of Letters Patent.   Patented Nov. 21, 1911.

Application filed April 6, 1911. Serial No. 619,388.

*To all whom it may concern:*

Be it known that I, GEORGE HOLDSWORTH, a citizen of the United States of America, and resident of Conesville, in the county of Coshocton and State of Ohio, have invented certain new and useful Improvements in Fruit-Gatherers, of which the following is a specification.

This invention relates to harvesters and particularly to a fruit gatherer.

An object of this invention is to provide a device of the character stated having novel means for detaching fruit from the trees and being provided with means for receiving the said fruit after it has been dislodged.

A further object of this invention is to provide a fruit gatherer comprising a head having fingers adapted to engage fruit for pulling it from the tree, the said head having novel means by which it may be connected to a handle whereby the picker may be manipulated.

A still further object of this invention is to provide a fruit gatherer in which the picker fingers are approximately parallel and in such number and in such relation to the receiving pouch as to facilitate the engagement of the fingers with the fruit and at the same time insuring the proper deposit of the fruit within the receptacle.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a plan view of the fruit gatherer embodying the invention; and Fig. 2 illustrates a side elevation thereof, partly in section. Figs. 3 and 4 illustrate detail views. Fig. 5 illustrates a side elevation of a portion of the head of the picking fingers, partly in cross section. Fig. 6 illustrates a top plan view of the shank portion and head of the picking fingers, showing the angular formation thereof, the shank portion being in cross section. Fig. 7 illustrates a front elevation partly in cross section of a section of the metallic head showing the head portion of the shank positioned therein.

In these drawings 4 denotes a head, the sides of which converge at the ends as shown at 5 and 6, the said head being preferably formed by a strip of metal bent on itself to form a loop 7 at one end of the head and having the extremities of the said material forming the head lying approximately parallel to form the arms 8 and 9 provided with spurs 10 and 11 respectively designed to be embedded in the handle 12 which is interposed between the arms.

A sleeve 13 is slidable on the arms and is flared toward its outer end so as to fit on a tapered end 14 of the handle which is interposed between the arms. By reason of the construction just indicated, handles of greater or less widths may be utilized in connection with the head and the handles may be readily applied to or removed from the arms of the head by the simple manipulation of the sleeve.

The head is provided with a series of apertures 15 near the looped end thereof, the said apertures being preferably of angular formation in order that the angular shanks 16 of the fingers 17 which fit in the apertures may be held against rotation with relation to the head. The fingers 17 are shown as lying approximately parallel with the plane of the head but a suitable distance therefrom in order to facilitate the engagement of the fingers with fruit to be picked, it being observed that the said fingers overlie a portion of the mouth of the receptacle 18 which is here shown in the form of a pouch having its margin secured to the head by the stitching 19, although any suitable means may be employed for securing the said pouch to the head.

It will be apparent from the foregoing description and from an inspection of the drawing that by proper manipulation of the fruit picker, the fingers may be caused to engage the fruit with the stem of the fruit passing between two of the fingers and that on exerting a pull on the picker, the fruit will be dislodged from its stem or from the branch of a tree from which the stem has sprouted and that the fruit so dislodged will gravitate into the pouch from which it can be removed by the operator.

Owing to the fact that the shanks of the fingers are fitted in sockets or holes in the head in a manner to prevent rotation of the said fingers, the relation of the fingers to one another will remain constant except in cases where they are accidentally damaged and there will always be sufficient space between the fingers to permit the stems of the fruit to be received between the fingers.

I claim—

In a fruit picker, a head, said head comprising a strip of metal bent to form a loop, said loop at one end thereof being provided with apertures angular in cross section, a pouch supported by said head, a plurality of independent picking fingers, said fingers comprising a shank portion angular in cross section the cross section of the shank portion conforming to the cross section of the apertures in the head, and a finger portion extending at right angles to the shank and parallel with the mouth of the pouch, the said fingers being arranged in pairs of different widths transversely the head to accommodate the fruit stems of different thicknesses.

In testimony whereof, I affix my signature in the presence of two witnesses.

GEORGE HOLDSWORTH.

Witnesses:
J. M. COMPTON,
C. O. TURNER.

Copies of this patent may be obtained for five cents each, by addressing the "Commissioner of Patents, Washington, D. C."